(12) United States Patent
Deshpande et al.

(10) Patent No.: US 9,191,226 B2
(45) Date of Patent: Nov. 17, 2015

(54) METHODS AND APPARATUS FOR DETERMINING COMMUNICATION LINK QUALITY

(75) Inventors: Manoj M. Deshpande, San Diego, CA (US); Arnaud Meylan, Bois-Colombes (FR); Ranjith S. Jayaram, San Diego, CA (US); Sanjiv Nanda, Ramona, CA (US); Alok Aggarwal, Foster City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 12/439,059

(22) PCT Filed: Sep. 28, 2007

(86) PCT No.: PCT/US2007/079813
§ 371 (c)(1),
(2), (4) Date: May 27, 2009

(87) PCT Pub. No.: WO2008/039962
PCT Pub. Date: Apr. 3, 2008

(65) Prior Publication Data
US 2009/0257361 A1    Oct. 15, 2009

Related U.S. Application Data

(60) Provisional application No. 60/848,414, filed on Sep. 28, 2006, provisional application No. 60/848,415, filed on Sep. 28, 2006, provisional application No. 60/945,054, filed on Sep. 28, 2006.

(51) Int. Cl.
*H04L 12/26* (2006.01)
(52) U.S. Cl.
CPC ............ *H04L 12/2697* (2013.01); *H04L 43/50* (2013.01)

(58) Field of Classification Search
USPC ......................................................... 370/249
See application file for complete search history.

(56) References Cited

U.S. PATENT DOCUMENTS 4,745,593 A    5/1988    Stewart
5,477,531 A    12/1995   Mckee et al.
(Continued)

FOREIGN PATENT DOCUMENTS

EP    0186343    7/1986
EP    1026855    8/2000
(Continued)

OTHER PUBLICATIONS

English Translation of JP 2001127795 A.*
(Continued)

*Primary Examiner* — Jason Mattis
*Assistant Examiner* — James P Duffy
(74) *Attorney, Agent, or Firm* — Steven R. Thiel (57) ABSTRACT

Methods and apparatus for determining the quality of a communication link transmitting a specified packet type are disclosed. The methodology includes configuring first packets, which share transmission characteristics with a specific packet type, such as a Voice over IP packet, such that the first packets experience similar communication link treatment as the specific packet type. The first packets are then transmitted over the communication link to a quality monitoring server located near a termination equipment of the particular communication link. Second packets, which are transmitted by the server in response to the first packets, are received and evaluated to determine the quality of the communication link based on characteristics of the second packets. Corresponding apparatus are also disclosed.

55 Claims, 6 Drawing Sheets

(56) References Cited

U.S. PATENT DOCUMENTS

| | | | |
|---|---|---|---|
| 5,563,875 | A | 10/1996 | Hefel et al. |
| 5,825,761 | A | 10/1998 | Tanaka et al. |
| 6,215,772 | B1 | 4/2001 | Verma |
| 6,526,140 | B1 * | 2/2003 | Marchok et al. ......... 379/406.03 |
| 6,539,205 | B1 | 3/2003 | Wan et al. |
| 6,542,499 | B1 | 4/2003 | Murphy et al. |
| 6,728,217 | B1 | 4/2004 | Amirijoo et al. |
| 6,745,012 | B1 | 6/2004 | Ton et al. |
| 6,751,198 | B1 | 6/2004 | McPherson et al. |
| 6,798,745 | B1 | 9/2004 | Feinberg |
| 6,934,258 | B1 | 8/2005 | Smith et al. |
| 2002/0058537 | A1 * | 5/2002 | Bhatoolaul et al. ........... 455/572 |
| 2002/0077786 | A1 | 6/2002 | Vogel et al. |
| 2002/0142788 | A1 * | 10/2002 | Chawla et al. ................ 455/504 |
| 2002/0154602 | A1 | 10/2002 | Garcie-Luna-Aceves et al. |
| 2002/0194609 | A1 * | 12/2002 | Tran ............................... 725/95 |
| 2003/0031185 | A1 | 2/2003 | Kikuchi et al. |
| 2003/0043773 | A1 * | 3/2003 | Chang .......................... 370/338 |
| 2003/0058792 | A1 | 3/2003 | Shao et al. |
| 2003/0091028 | A1 * | 5/2003 | Chang et al. .................. 370/352 |
| 2003/0115321 | A1 * | 6/2003 | Edmison et al. .............. 709/224 |
| 2003/0142651 | A1 | 7/2003 | Matta et al. |
| 2003/0152028 | A1 * | 8/2003 | Raisanen et al. .............. 370/235 |
| 2004/0141460 | A1 | 7/2004 | Holtzman et al. |
| 2004/0190507 | A1 | 9/2004 | Wu et al. |
| 2004/0246895 | A1 * | 12/2004 | Feyerabend ................... 370/229 |
| 2005/0064821 | A1 | 3/2005 | Hedberg et al. |
| 2005/0122901 | A1 | 6/2005 | Bonneville et al. |
| 2005/0143027 | A1 | 6/2005 | Hiddink et al. |
| 2005/0159166 | A1 | 7/2005 | Jonsson et al. |
| 2005/0185653 | A1 | 8/2005 | Ono et al. |
| 2005/0227698 | A1 | 10/2005 | Nonin et al. |
| 2005/0243729 | A1 | 11/2005 | Jorgenson et al. |
| 2005/0260992 | A1 * | 11/2005 | Moon et al. ................... 455/436 |
| 2005/0281392 | A1 | 12/2005 | Weeks et al. |
| 2006/0034188 | A1 | 2/2006 | Oran et al. |
| 2006/0209686 | A1 | 9/2006 | Wigard et al. |
| 2006/0209758 | A1 | 9/2006 | Qiang et al. |
| 2007/0008883 | A1 * | 1/2007 | Kobayashi .................... 370/230 |
| 2007/0153683 | A1 * | 7/2007 | McAlpine ..................... 370/229 |
| 2007/0195702 | A1 * | 8/2007 | Yuen et al. .................... 370/238 |
| 2007/0223388 | A1 * | 9/2007 | Arad et al. .................... 370/252 |
| 2010/0165857 | A1 | 7/2010 | Meylan et al. |

FOREIGN PATENT DOCUMENTS

| | | | | |
|---|---|---|---|---|
| EP | 1026885 | A1 | 8/2000 | |
| EP | 1047223 | | 10/2000 | |
| EP | 1253749 | | 10/2002 | |
| EP | 1455490 | | 9/2004 | |
| EP | 1463245 | | 9/2004 | |
| EP | 1511247 | | 3/2005 | |
| EP | 1531646 | A1 | 5/2005 | |
| JP | 58085654 | | 5/1983 | |
| JP | 2000224172 | A | 8/2000 | |
| JP | 2001127795 | | 5/2001 | |
| JP | 2001127795 | A * | 5/2001 | ............. H04L 12/56 |
| JP | 2004032668 | A | 1/2004 | |
| JP | 2005244525 | A | 9/2005 | |
| JP | 2005269170 | A | 9/2005 | |
| JP | 2006197351 | A | 7/2006 | |
| KR | 20030023898 | | 3/2003 | |
| WO | 9847308 | | 10/1998 | |
| WO | 0013321 | | 3/2000 | |
| WO | 0230042 | | 4/2002 | |
| WO | 0239673 | | 5/2002 | |
| WO | 2004006504 | | 1/2004 | |
| WO | 2004012403 | | 2/2004 | |
| WO | WO2004082219 | | 9/2004 | |
| WO | 2005055492 | | 6/2005 | |
| WO | WO 2005055492 | A2 * | 6/2005 | |
| WO | 2005101740 | | 10/2005 | |
| WO | WO 2005101740 | A1 * | 10/2005 | ............. H04L 12/26 |
| WO | 2006044836 | | 4/2006 | |
| WO | 2006064278 | | 6/2006 | |

OTHER PUBLICATIONS

Audio-Video Transport Working Group H Schulzrinne GMD Fokus S Casner Precept Software et al., "RTP: A Transport Protocol for Real-Time Applications; rfc1889.txt", IETF Standard, Internet Engineering Task Force, IETF, CH, Jan. 1, 1996.

Adachi M. et al., "NEPRI: Available Bandwidth Measurement in IP Networks", ICC 2000. 2000 IEEE International Conference on Communications. Conference Record. New Orleans, LA, Jun. 18-21, 2000; [IEEE International Conference on Communications], New York, NY: IEEE, US, Jun. 18, 2000, pp. 511-515, XP001043000 USBN: 978-0-7803-6284-0 p. 512-p. 513; figure 2.

International Search Report and Written Opinion—PCT/US2007/079813, International Search Authority—European Patent Office—Sep. 15, 2008.

Taiwan Search Report—TW096136473—TIPO—May 24, 2011.

* cited by examiner

METHODS AND APPARATUS FOR DETERMINING COMMUNICATION LINK QUALITY

CLAIM OF PRIORITY UNDER 35 U.S.C. §119

The present Application for Patent claims priority to Provisional Application Nos. 60/848,414, 60/848,415, and 60/945,054 respectively entitled "Handoff Triggers for WLAN and VoWLAN," "Estimation of the Path Quality to Assist Handoff Decision," and "Handoff Algorithms for VoIP over WLAN" all filed on Sep. 28, 2006, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"METHODS AND APPARATUS FOR DETERMINING QUALITY OF SERVICE IN A COMMUNICATION SYSTEM" by Meylan et al., application Ser. No. 12/438,133 filed on Sep. 28, 2007, filed concurrently herewith, assigned to the assignee hereof, and expressly incorporated by reference herein.

BACKGROUND

1. Field

The present disclosure generally relates to methods and apparatus for determining the quality of a communication link, and more particularly to determining quality of service of a communication link or path having wireless or wired network transmission of real time traffic, such as voice data.

2. Background

In communication systems, the utilization of applications using real time traffic, such as end-to-end Voice over IP (VoIP) calls, is ever increasing. The routing between end points involved in such applications will typically access an IP network (e.g., the Internet) through any one or a combination of a number of different communication network technologies. Examples of types of network technologies used may include Wireless Local Area Networks (WLAN) such as Wi-Fi (IEEE Std. 802.11), Cellular Networks such as 1X-EVDO, High Speed Packet Access (HSPA), Wireless Wide Area Networks (WWAN) such as WiMAX (IEEE 802.16), femtocells, and still other various known and to-be-defined network technologies. Accordingly, real time traffic may be exchanged over numerous networks in the routing between the end points. For example, in an end-to-end VoIP call between a user A and a user B in a residential setting, the VoIP packets can potentially traverse user A's Wi-Fi access network, user A's DSL or cable broadband network, an IP core network, user B's DSL or cable broadband network, and user B's Wi-Fi access network.

In the case of VoIP traffic, for example, the VoIP packets that carry voice data must traverse the overall network within a maximum allowable delay constraint to achieve an acceptable quality of service (QoS). Because VoIP packets traverse so many potentially disparate networks between end points of a voice call, and because broadband networks, such as the Internet, typically carry a myriad of types of data packets, the monitoring of the QoS for delay-sensitive voice packets within each network link is not generally feasible. Accordingly, the VoIP QoS is more easily monitored by one or both of the devices at the end points of a voice call (e.g., terminals such as a mobile phone or a computer), since such devices are affected by QoS degradation occurring anywhere within the networks utilized to route the call.

Although quality determination metrics are available in certain networks used to route a voice call, such as in the Wi-Fi Medium Access Control (MAC) Management Information Base (MIB), such metrics are not effective in determining the resulting path quality for all situations. Consider, for example, a VoIP call occurring in a Voice over Wireless Local Area Network (VoWLAN) in a residential environment. In order to determine QoS, at least four links need to be monitored: the downlink from a LAN access point (AP) to a communication terminal, the uplink from the communication terminal to the AP, the downlink from the call termination equipment (e.g., a media server at a VoIP service provider's network) to the AP, through the Internet backbone and the Cable/DSL backhaul, and an uplink from the AP to the call termination equipment through the Cable/DSL backhaul and the Internet backbone. It is possible for the communication terminal to monitor at least the first two of these links using locally visible events such as packet losses or signal strength, for example. However, there is no known mechanism that provides monitoring of the quality of the uplink and downlink between an AP and termination equipment. Accordingly, there is a need for a mechanism to measure or determine the QoS at a communication terminal or AP for at least a portion of a communication path from the AP to termination equipment, particularly paths carrying real time traffic.

SUMMARY

According to an aspect, a method for determining the quality of a communication link transmitting a specified packet type is disclosed. The method includes configuring or forming at least one first packet that shares at least one packet characteristic with the specified packet type such that the at least one first packet experiences similar communication link treatment as the specified packet type. Additionally, the method includes transmitting the at least one first packet over the communication link to a quality monitoring server located near a termination unit and then receiving at least one second packet transmitted by the server in response to a corresponding first packet. Finally, the method includes determining a quality of the communication link based on characteristics of the received at least one second packet.

According to another aspect, an apparatus for determining the quality of a communication link is disclosed. The apparatus includes means for configuring at least one first packet that shares at least one packet characteristic with the specified packet type such that the at least one first packet experiences similar communication link treatment as the specified packet type. The apparatus also includes means for transmitting the at least one first packet over the communication link to a quality monitoring server located near a termination unit, means for receiving at least one second packet transmitted by the server in response to a corresponding first packet; and means for determining a quality of the communication link based on characteristics of the received at least one second packet.

According to still another aspect, a communication device operable in a communication system is disclosed. The communication device includes a processor having a first module configured to configure at least one first packet that share at least one packet characteristic with the specified packet type such that the at least one first packet experiences similar communication link treatment as the specified packet type. The processor also includes a second module configured to transmit the at least one first packet over the communication link to a quality monitoring server located near a termination unit. The processor further includes a third module configured to receive at least one second packet transmitted by the server in response to corresponding first packets, a fourth module configured to determine a quality of the communication link based on characteristics of the received at least one second packet.

According to yet one further aspect, a computer program product comprising: a computer-readable medium is disclosed. The medium includes code for causing a computer to configure at least one first packet that shares at least one packet characteristic with the specified packet type such that the at least one first packet experiences similar communication link treatment as the specified packet type. The medium further includes code for causing a computer to transmit the at least one first packet over the communication link to a quality monitoring server located near a termination unit, and code for causing a computer to receive at least one second packet transmitted by the server in response to a corresponding first packet. Finally, the medium includes code for causing a computer to determine a quality of the communication link based on characteristics of the received at least one second packet

DETAILED DESCRIPTION

Figure 1:
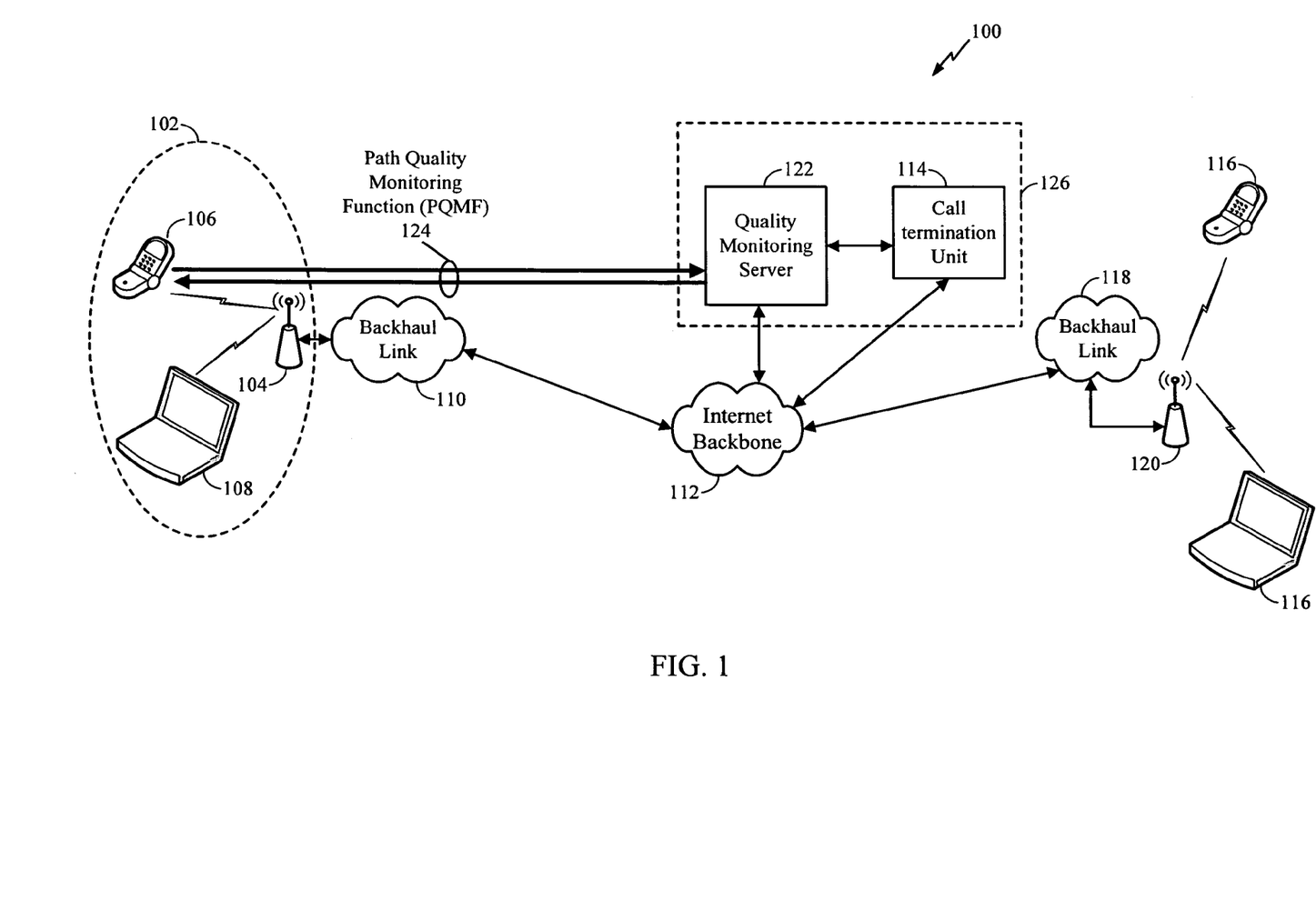
FIG. 1 is a diagram of a communication system effecting VoIP communication that employs quality determination.

FIG. 1 is a diagram of an exemplary communication system 100 employing path quality determination. As will be detailed, system 100 is useable for making VoIP calls between two end points (e.g., two communication terminals or stations). System 100 may include a local area network 102, such as a wireless local area network (WLAN) 102, which may operate according any one of numerous wireless networking standards, such as Wi-Fi (IEEE Std. 802.11). The local area network 102 includes an access point (AP) 104 that communicates with communication terminal end points, such as a mobile device 106 or other electronic devices such as a computer 108. AP 104 is, in turn, in communication with a backhaul link 110.

Backhaul link 110 may comprise any one of a number of types of network connections, such as a digital subscriber line (DSL) or a cable broadband connection. The backhaul link 110 serves to communicatively couple the local area network 102 with a wide area network, such as an Internet backbone 112. In particular, the backhaul link 110 is terminated at a call termination unit 114, which communicates with Internet backbone 112. In an example of VoIP service, the call termination unit 114 may be configured as a media server within the network of a VoIP service provider. The Internet backbone 112 is used to transmit real time traffic, such as VoIP packets to end terminal devices 116 at another end of the end-to-end connection via another backhaul link 118 and an AP 120, as examples.

It is noted that each terminal end point (e.g., 106, 108) could be configured to simply monitor the quality provided by the LAN 102. As an example where AP 104 is a Wi-Fi AP, terminal 106 could monitor known WLAN parameters such as Received Signal Strength Indicator (RSSI), signal-to-noise ratio (SNR), failed frame receptions, down link frame retransmissions, and network load, as examples, to estimate the quality of the Wi-Fi downlink. Similarly, the terminal could also monitor parameters such as uplink frame retransmissions, and failed frame transmissions, as examples, to estimate the quality of the Wi-Fi uplink. Upon determining degradation of either the Wi-Fi uplink or Wi-Fi downlink or both, the communication terminal (106, 108) can take appropriate measures to improve call quality such as handing off the call away from AP 104 to another network (not shown) or adapting media encoding characteristics. Additionally, the terminal can terminate the call if no network with suitable QoS can be found.

Although it is desirable that each terminal end point monitors the local WLAN access link and detects any degradation, such support in the terminal is implementation specific. In addition to the above WLAN metrics, each terminal could also be configured to monitor additional WLAN parameters such as RTP layer packet loss, packet jitter, playout buffer statistics, and RTCP reports. Although these metrics may be used to identify loss of end-to-end QoS, they cannot be used to attribute the quality degradation to links beyond WLAN local access. For example, consider a VoIP call between terminals 106 and 116 in FIG. 1. RTP packet losses at 106 can be caused by degradation of backhaul link 110, which is the AP downlink of terminal 106, or backhaul link 118, which is the AP uplink of terminal 116. If link 110 degrades, terminal 106 can improve call quality by handing the call off to a network (not shown) that does not use this link. However, such a handoff by terminal 106 will not help improve call quality if link 118 is degraded. In such a case, terminal 116 would need to take appropriate measures to improve call quality. Accordingly, a simple approach to triggering handoff from a WLAN to a wide area network WAN, for example, based only on observed degradation in QoS may not always work and can introduce needless overhead.

It is noted that core network carrying the call traffic (i.e., the Internet backbone 112) is typically well provisioned and supports QoS. Accordingly, for purposes of the present disclosure, it is assumed that LAN local access and broadband connectivity (i.e., backhaul link 110) are leading causes of quality degradation.

Accordingly, exemplary system 100 also may include a quality monitoring server 122, which is used to assist in determining QoS of the communication link between a terminal 106, for example, and the call termination unit 114. As will be described in more detail herein, a path quality monitoring function (also referred herein with the acronym "PQMF") may be effected by a terminal or station (e.g., mobile communication device 106) that transmits packet information over the networks in the communication path to the quality monitoring server 122, which, in response, returns packet information back to the terminal or station 106 for determination of the path quality. Arrows 124 illustrate this functionality in FIG. 1. Additionally, the quality monitoring server 122 may be located as near as possible to the call termination unit 114, and may even be incorporated or integrated with unit 114 as illustrated by dashed line 126. Accordingly, the PQMF serves to measure the uplink and downlink path quality between a terminal and the call termination 114. It is noted that server 122 can be implemented as an algorithm executing on a processor or a module that functions to receive a PQMF packet, process it, determine what packet to send as a response, and send this response.

Furthermore, it is noted that the packets used by the PQMF are configured to mimic or have at least one or more shared characteristics to those packets for which transmission quality over the link is of concern. More specifically, the PQMF packets are configured to have sufficient shared characteristics to ensure that the packet will be treated by the network with the same grade of service that the data packets of concern receive. For example, VoIP packets or real time protocol (RTP) packets receive a higher grade of service over non-real time packets. Thus, the PQMF packets used to determine QoS for VoIP packets are configured with the same VoIP packet characteristics that affect network grade of service treatment of those VoIP packets. Accordingly, using packets for the PQMF having shared characteristics to the packets of concern (e.g., RTP or VoIP packets) enhances the accuracy of the monitoring function because the PQMF packets receive the same network treatment (and, thus, QoS).

As merely an example, but not limited thereto, a shared characteristic may be the Type of Service (TOS) field in the IP packet header of the PQMF packet. This shared characteristic would engender a same quality of service between the packets of concern and the PQMF packets. It is further noted that from an implementation standpoint, the packet sizes of the PQMF packets may also be sized to match any one of a number of potential sizes of the packets of concern. For instance, the PQMF packets may be configured to match the packet sizes of whatever coder/decoders (codec) are being used during transmission and reception of the packets.

Measurements based on characteristics of the packets sent to and from the path quality monitoring server 122, such as the packet round-trip time, allow the terminal device (e.g., 106, 108) to measure the quality of the entirety of the path (i.e., the downlink and the uplink), which traverses the LAN 102 and the backhaul 110. It is noted that in an exemplary implementation the PQMF packets sent by communication terminal 106 and those PQMF packets returned to terminal 106 by server 122 in response may be configured the same so that both the uplink and downlink quality of treatment most closely mimics the network treatment of the packets of concern.

The terminal devices (106 or 108) may then utilize the determined quality to make more accurate decisions to improve call quality, such as whether to trigger a handoff to another network, or whether to change the data rate or the coding rate.

System 100 is illustrative of a single, simple network configuration. Many additional, more complex configurations of system 100, however, are contemplated, including alternative electronic devices and various wireless and wired networking protocols. Additionally, components in system 100 can be configured to facilitate the mobile communication terminal 106, for example, seamlessly switching between an AP 104 currently being utilized by the terminal 106, to another network. Moreover, although system has been described specifically in connection with a QoS determination for real time traffic, such as voice data (VoIP), it is contemplated that the QoS determination may be utilized for other packet transmissions over the backhaul, such as the Transmission Control Protocol (TCP) or the User Datagram Protocol (UDP).

Figure 2:
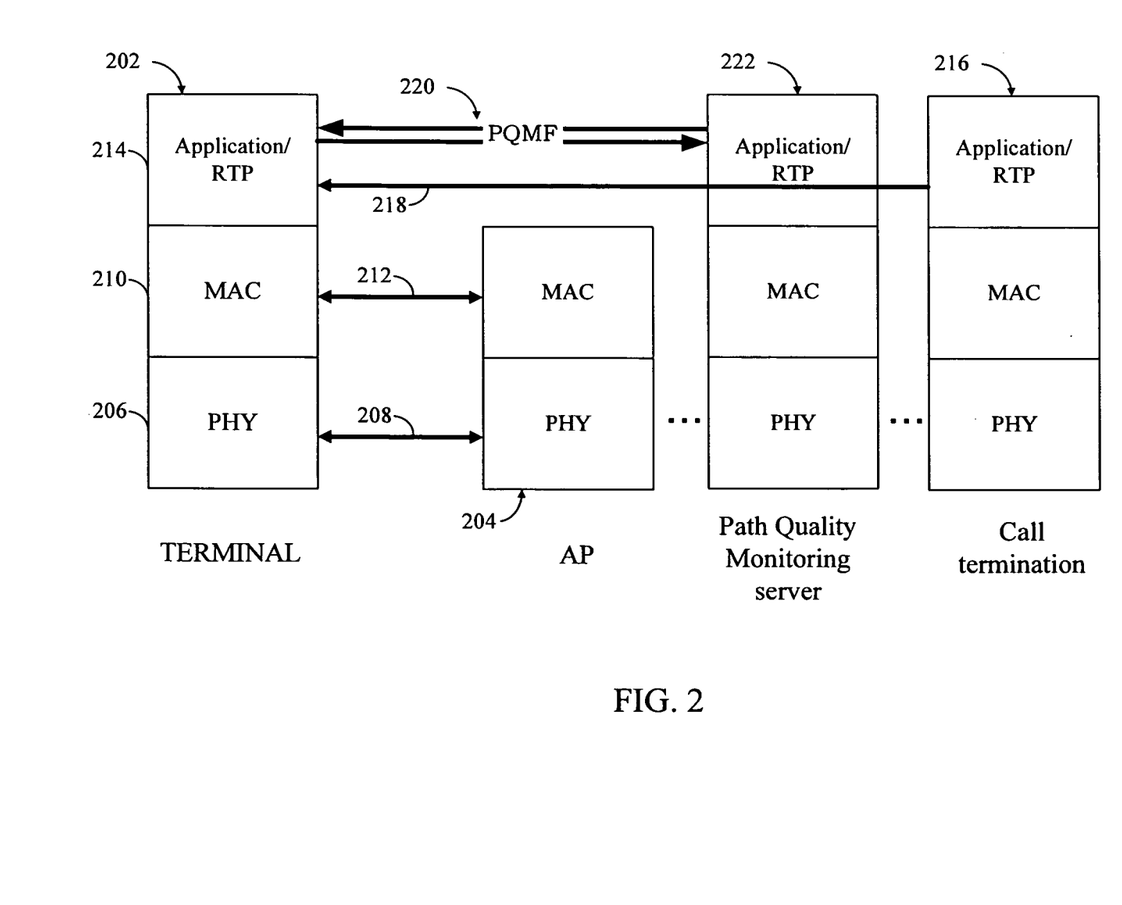
FIG. 2 illustrates a block diagram illustrating the levels on which quality determination or monitoring metrics are performed in communication system.

FIG. 2 illustrates a block diagram illustrating layers on which quality is determined or metrics are monitored in a communication system, such as system 100 in FIG. 1. An end point terminal 202 participating in a VoIP call may be configured to monitor different QoS metrics on various layers. As shown, the terminal 202 functionally monitors physical layer (PHY) parameters or metrics on the link between the terminal 202 and an AP 204, as illustrated by layer 206 and arrow 208. PHY layer metrics may include, for example, a received signal strength indicator (RSSI). Additionally, the terminal 202 may include monitoring of the medium access control (MAC) layer, as indicated by layer 210 and arrow 212. Metrics measured at the MAC layer may include, for example, a number of Acknowledgement Failures or Frame Check Sequence (FCS) errors.

To determine if the wireless link is bad in the case of a WLAN, for example, a terminal 202 can use MAC-layer metrics and PHY-layer metrics. For other network pathologies, however, monitoring at higher levels can assist a terminal to determine whether problems exist in the backhaul, for instance. Accordingly, the terminal 202 may also monitor metrics at higher levels, illustrated as an "application" or RTP layer 214. For example, the terminal 202 may monitor the number of VoIP packets lost in the application layer. This is illustrated by arrow 218 from a VoIP call termination 216 to the terminal 202, indicating the monitoring of lost downlink packets from the call termination 216 in the application or RTP layer.

As was mentioned previously, there still may be cases where use of the above-metrics to assist in deciding whether to trigger a handoff may not improve QoS and can introduce needless overhead. For example, assuming the source of quality problems is occurring on a remote side (i.e., after the VoIP call termination 216), the application layer metric may nonetheless indicate a large download packet loss, even though the local LAN and backhaul link is good. Thus, triggering a handoff away from the local LAN to another network as result of such detection will not yield a QoS improvement since the problem is at the remote end. Such a handoff introduces needless overhead and obviates the potential advantages of retaining the call on the LAN. A subscriber may like to retain the call on the LAN for cost as well as performance reasons. Conversely, the application layer metric may indicate negligible downlink packet loss, while the backhaul uplink is degraded causing problems to the remote side. Thus, the lack of a triggered handoff away from the local LAN will result in continued degradation of QoS for the remote side. As yet another example, a handoff from a WAN to the local LAN may be indicated based on a suitably detected signal strength on the LAN. If the backhaul quality is degraded, however, a handoff to the local LAN would cause poor call quality after handoff in such a case.

In light of the above examples, the presently disclosed methods and apparatus therefore employ PQMF to remedy these and similar situations. As illustrated in FIG. 2, the application/RTP layer 214 in terminal 202 may exchange PQMF packets 220 with the path quality monitoring server 222, as was discussed above in connection with FIG. 1. PQMF 220 consists of a transmitted first packet (e.g., an RTP) configured by the application layer 214 in terminal 202 that matches the type of packet for which QoS determination is relevant, such as a VoIP packet in the presently disclosed examples. The server 222 then assists by issuing a second or return transmitted packet in response to receipt of the first packet from terminal 202.

In a network assisted approach, as illustrated in FIG. 2, where a server 222 assists PQMF, the detection of path quality degradation resides in the terminal (e.g., 202) and may be implemented through software, hardware, or a combination thereof. The terminal 202 exchanges packets with the PQMF server 222 located upstream at or near a call termination 216. Placement of the PQMF server (e.g., server 122 in FIG. 1 or server 222 in FIG. 2) at the upstream VoIP call termination 216 facilitates effective broadband monitoring (e.g., monitoring of the backhaul) and all the traffic emanating from the terminal (signaling as well as the bearer) is guaranteed to traverse through to the broadband termination.

Figure 3:
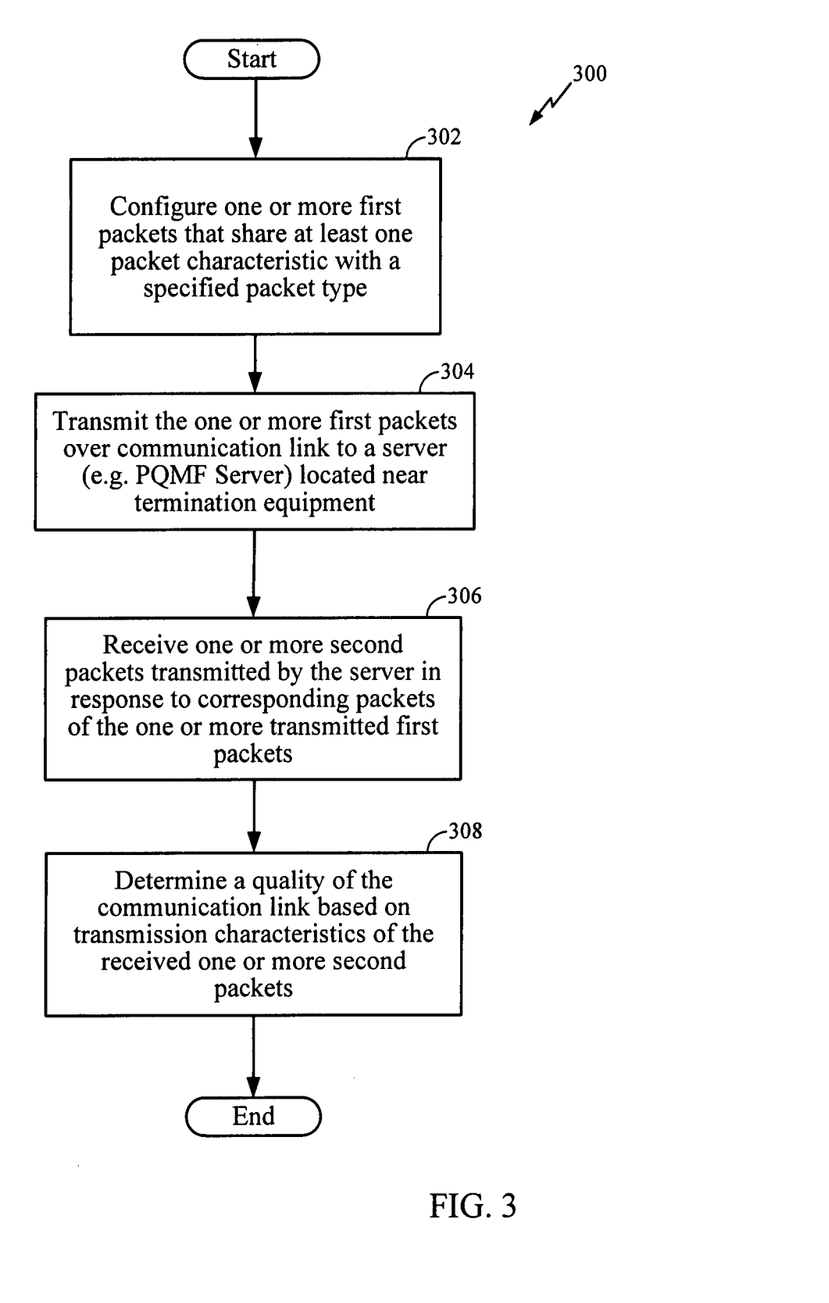
FIG. 3 is a flow diagram of a method for determining communication link quality in a communication system.

FIG. 3 is a flow diagram of a method 300 for determining communication link quality in a communication system, such as the systems in FIG. 1 or 2. Method 300 includes configuring one or more first packets that have shared characteristics with the packet type for which a quality determination is desired, as shown in block 302. As discussed before, according to an aspect the PQMF packets are configured to have the same protocol, type of service (ToS), and size, as the data packets of concern to ensure the same transmission characteristics over the network.

It is noted that an end point terminal, such as terminal 202 or communication device 106, as examples, may implement the process of block 302 (and initiation of the path quality monitoring). Additionally, alternative implementations of the process in block 302 may include initiation of path quality monitoring by an AP or some other device within the network, or initiating path quality monitoring in concert with another end point terminal. For example, terminal 106 may receive a report from a peer communication terminal such as one of devices 116 indicating poor link quality. In response, the terminal may transmit one or more first PQMF packets to the PQMF server to initiate determination of QoS for the LAN 102 and backhaul 110 to see if the problem is on the end of terminal 106. Further to this example, if the quality of the communication link of terminal 106 to the call termination 114 is determined to be good through transmission of the PQMF packet, the terminal 106 could be further configured to send a message to the peer communication terminal 116 indicating that communication link quality is good.

After configuration of the first packets, the packets are transmitted over a communication link or network to a server (e.g. PQMF Server 122 or 222) located near termination equipment (e.g., termination 114 or 216) as indicated by block 304. Again, an end point terminal (e.g., 106 or 202) may implement this process. Additionally, the server is located near a call termination to ensure transmission of the first packet over the LAN, as well as the backhaul. After the first packet is transmitted, one or more second packets are transmitted by the server in response to each corresponding transmitted first packet as indicated in block 306. That is, the server responds to each first packet type received by returning a corresponding second packet back to the terminal. It is noted that, according to an aspect, the second packets are configured with the same shared characteristics as the first packet type to ensure the same grade of service treatment in the downlink path. It is contemplated, however, that the first and second packets do not necessarily need match each other. Furthermore, the server may be configured to compute statistics concerning the transmission of the first packets. In such case, one or more of the second packets could also be configured to carry these computed statistics to the terminal.

After transmission of the second packets, a path quality of the communication link is determined based on transmission characteristics of the received second packets corresponding to the transmitted first packets as shown in block 308. Characteristics include the time the second packet is received at the device transmitting the first packet, providing a round trip time of the first and second packets, which allows determination of delays. Other characteristics may include packet loss or jitter determination when a plurality of first and second packets are sent and received, respectively. In an example, packet loss or jitter is computed over a plurality of packets, including packets exchanged in the past, After the process of block 308, it is noted that further processes (not shown) may include determining handoff triggering for a terminal based on the path quality determination.

It is noted that it is desirable for the process 300 to be performed in a short duration (low latency) to provide quick feedback of the path quality estimation. Quick estimation helps trigger handoffs more quickly when necessary and does not introduce large latency in the eventual handoff. Fast handoff, in turn, will ensure QoS for the voice call. As examples, two ways are contemplated to better ensure low latency.

First, the PQMF process should be completed quickly. Fast completion of the PQMF procedure will reduce the latency of determining path QoS, as well as help reduce the overhead needed for this determination.

Secondly, the PQMF procedure should start early. The earlier a PQMF procedure is started, the sooner a terminal can respond to quality degradation. Early triggers that start a PQMF procedure can, however, be false positives, resulting in spurious determinations of path quality. Such false positives and the corresponding overhead can result in an unwanted increase in traffic. Additionally, the PQMF procedure may be performed more or less frequently depending on the state of the protocol. For instance if a second packet was not received in return, a first packet may be sent soon after to sample the link again. When the terminal is idling, the PQMF process may be performed less often in order to minimize network load.

The process 300 should also present low overhead in the network. One reason for this is that if the PQMF procedure is executed when the path quality is deteriorating, the procedure should not introduce large traffic in the network, which would serve to deteriorate the conditions further. Each path quality estimation phase (i.e., the sending and receiving of packets to the PQMF server) should be small in number of transmissions. Also, the total number of phases may be limited by introducing sufficient hysteresis between successive phases.

Moreover, process 300 should effect accuracy in the path quality estimation. Errors in estimation may result in wrong handoff decision and, as discussed previously, unnecessary handoffs may not improve the quality of the call, will incur overhead, and, thus, will obviate any of the advantages that could have been realized by retaining the call on the local area network. Conversely, not performing a handoff when necessary can also adversely affect the QoS of the call.

Additionally, execution of the procedure 300 of FIG. 3 may be initiated based on various different criteria. One criterion may be based on triggering in response to certain detected conditions. Examples may include, but are not limited to, two or more consecutive missing RTP frames detected at the application layer, a set number of missing RTP frames within a predetermined number of expected frames, large jitter observed in a predetermined number of successive RTP frames, or receipt of an indication from the other end complaining about quality. RTCP reports or other types of reports may be used.

Another criterion for execution of procedure 300 may be based on a predetermined periodicity or repetition. More particularly, according to an example, a large period or interval may be set between transmission of PQMF packets (which can be termed as "slow PQMF"), allowing a terminal to periodically measure the link quality without introducing substantial network overhead. According to another example, when the slow PQMF procedure indicates potential quality problems, the terminal can dynamically switch to smaller intervals (termed "fast PQMF") to more accurately measure link quality statistics such as the packet loss rate. Fast PQMF can also be triggered by other terminal conditions, such as call initiation on Wi-Fi, sudden increases in downlink packet loss, and so forth. In this way, the terminal is able to monitor the link quality at all times while keeping network overhead low.

Furthermore, it is noted that many applications are known to send packets at unequally spaced intervals. For example, discontinuous voice codecs, such as AMR, EVRC, and EVRC-B, can adapt the packet spacing from 20 ms to as high as 640 ms during silence periods. Estimating packet loss for such vocoders may yield an inaccurate estimate of the link quality. For example, losing one frame out of three during silence would show an overly pessimistic 33% loss rate, and could trigger a needless handoff. A packet loss metric will not update at all for codecs that completely stop transmitting frames during silence, such as certain implementations of G.711. In cases where very few packets are observed during a packet loss measurement interval, the terminal can rely on PQMF to accurately indicate the link quality.

It is noted here that various contemplated implementations for network assisted approaches will be appreciated by those skilled in the art. In the discussion following, some examples of such implementations for locating the PQMF server, similar to server 222 shown in FIG. 2 are discussed. It is further noted that the implementations may utilize standardized or proprietary protocols, rather than implementing a dedicated PQMF packet protocol.

In one example, a communication terminal can use the Internet Control Message Protocol (ICMP) to effect path quality monitoring. In such case, an initiating terminal can use a traceroute-like functionality to discover the broadband termination, and then use ICMP ping-like functionality to monitor the quality afforded by the broadband. Additionally, the 3$^{rd}$ Generation Partnership Project (3GPP) has introduced a Packet Data Gateway (PDG) function as a secure gateway into a service provider's core network. The corresponding 3GPP2 function is termed Packet Data Interworking Function (PDIF). The terminal establishes secure IPsec tunnel with the PDG using Internet Key Exchange (e.g., IKEv2) protocol. In such case, the PQMF can be located at the PDG because the latter is located close to the VoIP call termination.

The VoIP service provider normally manages PDG and, thus, deployment of the PQMF at the PDG may be easier. Moreover, IKEv2 protocol provides hooks to assist PQMF implementation. A carrier may deploy the VoIP service such that both the signaling as well as the bearer traffic to and from the terminal traverses the IPsec tunnel. In such an implementation, traffic from the terminal to the PQMF server will have the same characteristics as VoIP traffic on the shared network path.

It is noted that in an example of a Skype™ type network, for example, bearer traffic is often routed via a super node. Similar solutions are being standardized where all the traffic to and from a terminal is routed via an intermediate media relay. In presence of such a media relay, the PQMF "server" can be located there. The path quality monitoring (PQM) protocol exchange and the corresponding metrics then will be indicative of the quality afforded by the shared network path to the VoIP traffic.

Furthermore, Generic Access Networks (GAN) promote an architecture where a handset and GAN controller (GANC) encapsulate GSM NAS signaling and GSM coded voice in an Internet Protocol Security (IPsec) tunnel. The GANC interfaces with the GSM core network and performs necessary emulation to retain an interface to a mobile switching center MSC and Gb interface to a Serving GPRS Support Node (SGSN). In the GAN network, PQMF can be located at the GANC. All the signaling and traffic is routed through the GANC. With the placement at the GANC, the PQMF "server" and the terminal can coordinate to determine the path quality. Accordingly, degradation in path quality can serve as the necessary trigger to perform GAN hand off to GSM (roveout). Alternatively, on detection of degradation of the path quality, the terminal, and the media gateway, the GANC can renegotiate the media characteristics such as coding rate, redundancy, bundling, and so forth. This renegotiation may be useful when WAN coverage is not adequate to perform the handoff.

The presently illustrated examples of FIGS. 1 and 2 show a network assisted approach, where a terminal contains the intelligence to initiate and detect path quality, while a server residing at or near the call termination is responsive to packets sent by the terminal. It is noted that one skilled in the art will appreciate that other approaches may be utilized to effect the disclosed path quality monitoring functionality. For example, a network controlled approach may instead be utilized where the intelligence to initiate and detect the quality estimation resides in the network, rather than with the terminal. In this example, the network would then detect QoS degradation and notify the terminal if a handoff is warranted. Another contemplated approach is an end to end approach where the intelligence to detect the quality deterioration resides in the end point terminals. Upon QoS degradation, the terminals coordinate with each other to determine the source of the problem and the terminal on the degraded end of the path takes appropriate measures to improve call quality.

Figure 4:
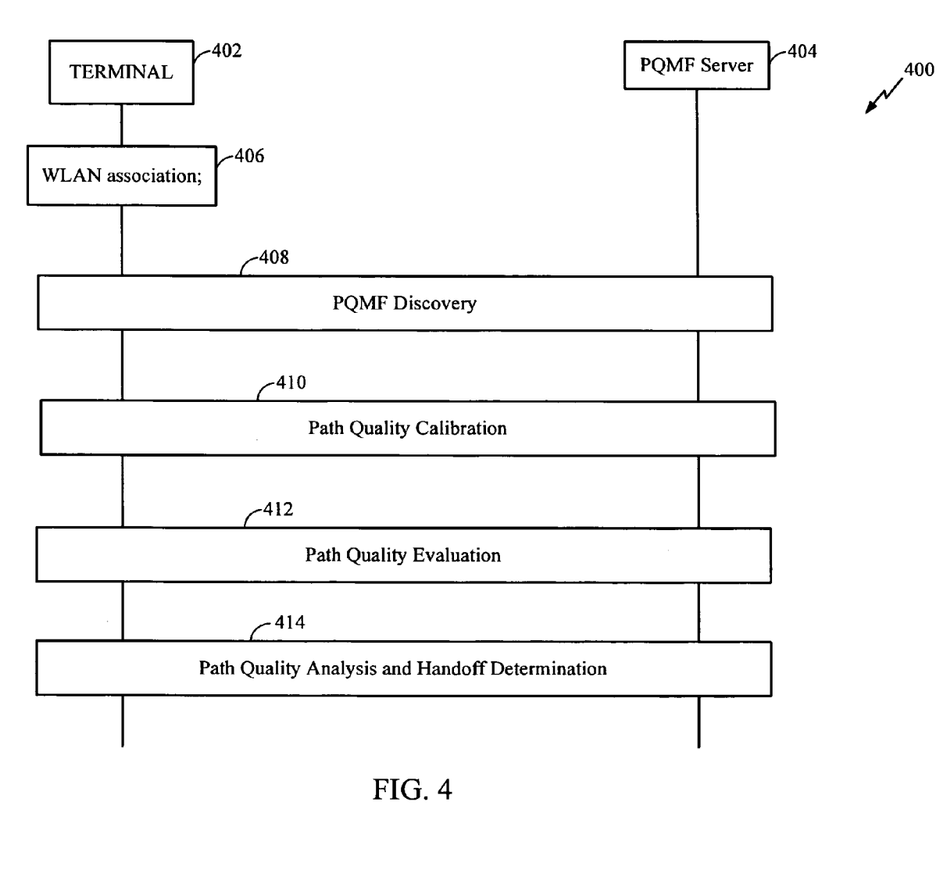
FIG. 4 is a block diagram illustrating protocols used for a path quality monitoring functionality.

FIG. 4 is a block diagram illustrating protocols used for an exemplary implementation of a path quality monitoring functionality. As shown, the path that is monitored for quality is the path between a terminal 402 and a PQMF server 404. The terminal 402 is associated with a local area network, such as a wireless LAN (WLAN) as shown by block 406. Additionally, in an example of VoIP traffic, the terminal 402 may undergo VoIP registration for those particular LAN network infrastructures affording convergence of data, speech, and mobile network technology over an IP based infrastructure.

After a terminal is associated with the LAN, a PQMF discovery may then be initiated as illustrated by block 408. The terminal discovers an IP address of the PQMF server or functionality 404. The specific processes performed for discovery are dependent on the choice of the underlying protocol. When a PQMF server or functionality is discovered, a Path Quality Monitoring calibration may be performed, illustrated by block 410. In particular, the terminal 402 may calibrate the path quality by initiating the path quality monitoring exchange. As an example, the terminal 402 may transmit a number $x_c$ Path Quality Measurement Request messages to the PQMF server 404 every $y_c$ duration. The PQMF server 404 responds with the Path Quality Measurement Response messages. The terminal 402 collects the responses and determines the metrics such as delay, jitter, and loss rate. The calibration procedure can be executed either during a VoIP call, as an example, or when idle. The calibration process can be repeated as often as necessary. Furthermore, each new calibration measurement can be used to filter the previous calibration measurements.

The calibration process 410 need not be performed at every registration. The terminal can store the results of the last calibration and associate these results with the WLAN identity, for example. As an example in the case of Wi-Fi networks, the WLAN identity can be the AP's MAC address. The terminal 402 can reuse these results on subsequent associations. Alternatively, the terminal can also hardcode the values for the required QoS parameters and thus may not require a calibration process. The calibration results can also be used to determine whether to place a VoIP call on the WLAN or not. If the calibration results indicate lack of sufficient QoS on the path involving WLAN, the terminal can decide to place the call on the WAN instead of the LAN. Furthermore, the terminal may store the result of the calibration in the local database. Moreover, repeated failures to support a required QoS can also be used to blacklist particular WLANs for further calls.

After calibration, a path quality evaluation is performed as indicated by block 412. According to an example, terminal 402 may execute a PQMF exchange at predefined intervals or upon the occurrence of a trigger. The terminal 402 transmits a number $x_t$ Path Quality Measurement Request messages (e.g., the first packets referred to above with respect to FIG. 3) to the PQMF server 404 every $y_t$ duration. The duration or rate at which request messages are sent should be optimized to ensure accurate measurement, while not meaningfully affecting the traffic on the path being measured. The PQMF server 404 responds with Path Quality Measurement Response messages (e.g., the second packets referred to in connection with FIG. 3). The terminal 402 then collects the responses and determines the metrics such as delay, jitter, and loss rate.

After path quality evaluation in block 412, terminal 402 may initiate a further path quality analysis and determine a handoff decision based on the analysis outcome as illustrated by block 414. Terminal 402 compares the trigger metrics with the previously baselined calibrated metrics. On detection of path quality degradation, the terminal 402 may initiate a handoff to another network, such as a WAN, or, alternatively, adjust its data rate and a coding rate.

It is noted that some of the functional blocks in FIG. 4 are optional, such as registration and discovery, as examples. Also, the functions of block 408, 410, 412, and 414 are not necessarily executed in a sequential order, and two or more of these functions may be executed concomitantly.

It is further noted that implementation of the disclosed PQMF methods and apparatus discussed above may be through use of a custom protocol for the packets/messages. Nonetheless, one skilled in the art will appreciate that existing known protocols can alternatively be reused or modified to effect the disclosed path quality monitoring, such as Internet Control Message Protocol (ICMP), and Internet Key Exchange (IKE), as examples. These alternative protocols are addressed briefly below in the context of the diagram of FIG. 4.

Concerning ICMP, if the PQMF server 404 is located at the PDG/PDIF, the discovery procedure 408 will identify the IP address of the PQMF server for purposes of discovery by a terminal (e.g., 402 in FIG. 4). With the use of ICMP, the terminal 402 may use an ICMP echo request packet as the Path Quality Measurement Request Message. The PQMF executed by server 404 then may use ICMP echo response packet as Path Quality Measurement Response Message. Reuse of ICMPs procedures for the purpose of PQMF eliminates development of a new protocol, thus minimizing deployment delays and complexity.

It is noted that if the terminal 402 attempts the ICMP procedure with a DSLAM or a CMTS router, there is a likelihood that the ICMP procedure may not succeed since often network elements disable ICMP procedure for security reasons. To ensure success in PQMF discovery as well as evaluation, the PQMF server may be located at the PDG/PDIF. To enable this, a VoIP service provider may support ICMP procedure at the PDG/PDIF. The terminal can then execute ICMP procedure with the PDG/PDIF over the IPsec tunnel. Since it is beneficial that intermediate routers process the ICMP packets similar to the media traffic (e.g., VoIP traffic), terminal 402 can be configured to mark the IP datagrams carrying the ICMP echo request with the same type of service (TOS) field (diffserv marking) as the media traffic. The PQMF can be configured to also mark ICMP echo response appropriately.

Generally, marking only the TOS field of the ICMP packet is not sufficient, as intermediate routers may look at the additional fields such as protocol type to schedule the packet processing. However, due to the use of the IPSec tunnel to route the ICMP packets, the intermediate routers cannot inspect the inner packet. The marking on the outer packet ensures that the ICMP packets and the VoIP packets are processed similarly on the network path between the terminal and PQMF to ensure accurate path quality measurement for the media traffic of interest.

The second alternative uses the IKE (e.g., IKEv2) protocol, which provides hooks to assist in the path quality monitoring function (PQMF) implementation. In particular, IKEv2 supports informational exchange where a request message in an IKEv2 informational exchange may not contain payload. According to the protocol, the IKEv2 peer must respond to the request with a response message. This keep-alive feature can be capitalized upon for estimating path characteristics. It is contemplated that the terminal 402 and PQMF server 404 can use these IKEv2 messages for the Path Quality Measurement Request and Path Quality Measurement Response messages. Moreover, the terminal 402 will mark the IKEv2 informational request with the same diffserv marking as the VoIP traffic to ensure that the requests match the network's conveyance of VoIP traffic, and thus accurate measurement. Likewise, the PQMF server 404 will also mark the IKEv2 informational response appropriately.

Figure 5:
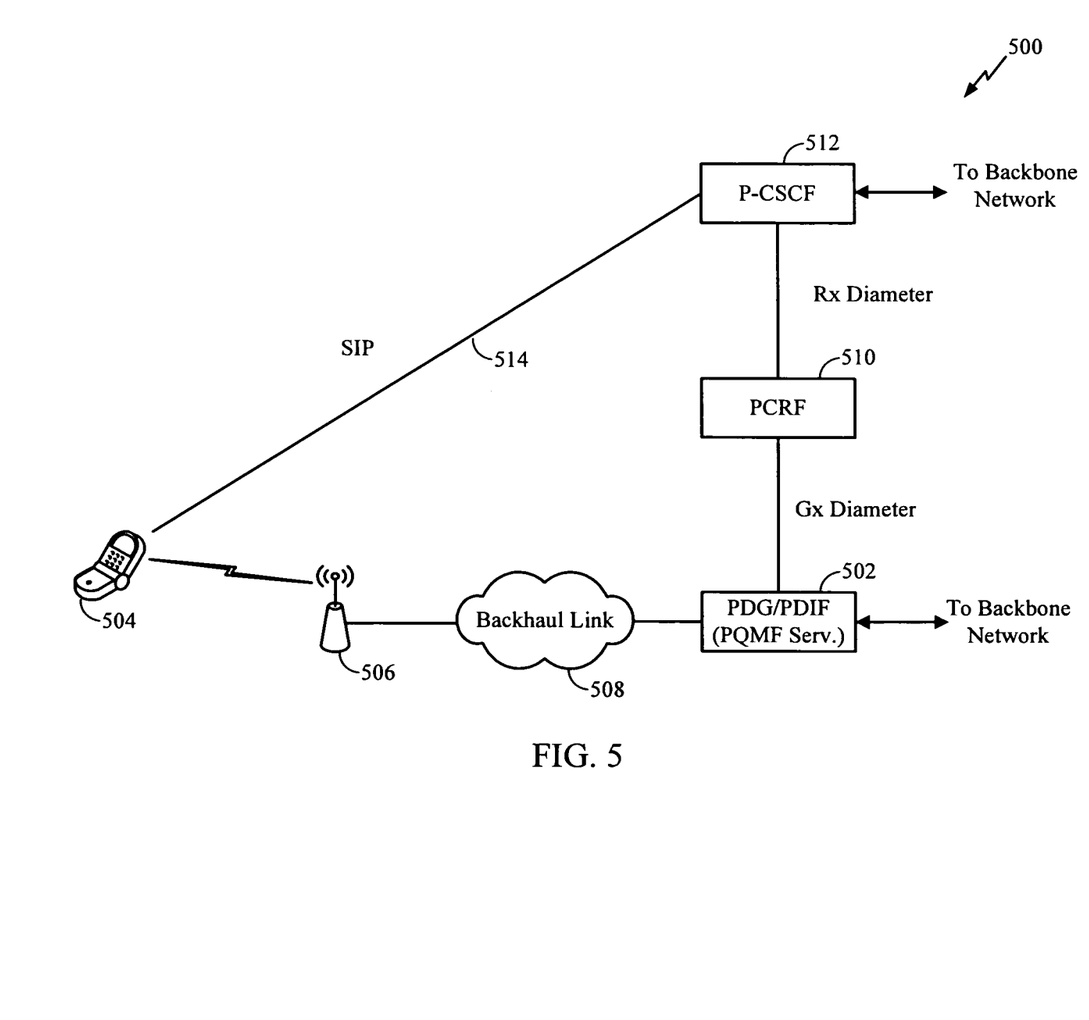
FIG. 5 illustrates a communication system employing an exemplary implementation for path quality monitoring under network control.

As mentioned previously, a network controlled approach for implementing PQMF in a communication system is also contemplated. FIG. 5 illustrates an exemplary implementation for PQMF in a network controlled manner in a communication system 500. In particular, such an approach places PQMF functionality in a PDG/PDIF 502, which will observe the VoIP traffic flow. By monitoring flows from each end point, the PQMF at PDG/PDIF 502 can discern the side on which quality deterioration is happening. When the PQMF determines that the deterioration is happening on a path between a terminal 504 and PQMF (e.g., AP 506 and backhaul 508), PQMF can coordinate with PCRF 510 and P-CSCF 512 to notify the terminal 502 regarding quality degradation and need for handoff. The PQMF residing at the PDG 502 will use the diameter protocol (Gx diameter) to report to the PCRF 510 any degradation in quality. The PCRF 510 relays this information to the P-CSCF 512 using diameter protocol (Rx diameter). The P-CSCF 512, in turn, notifies the lack of QoS to the terminal 502 using Session Initiation Protocol (SIP) signal 514, for example. Alternatively, PQMF at PDG 502 and terminal 504 can directly communicate with each other using a custom protocol to notify the terminal 502 of the need to perform handoff.

A further example of a network controlled PQMF implementation may include the use of a femtocell instead of a WLAN AP. The femtocell would be configured to perform the PQMF process, exchanging PQMF packet with a PQMF server. The femtocell server would then initiate handoff of the terminal.

Figure 6:
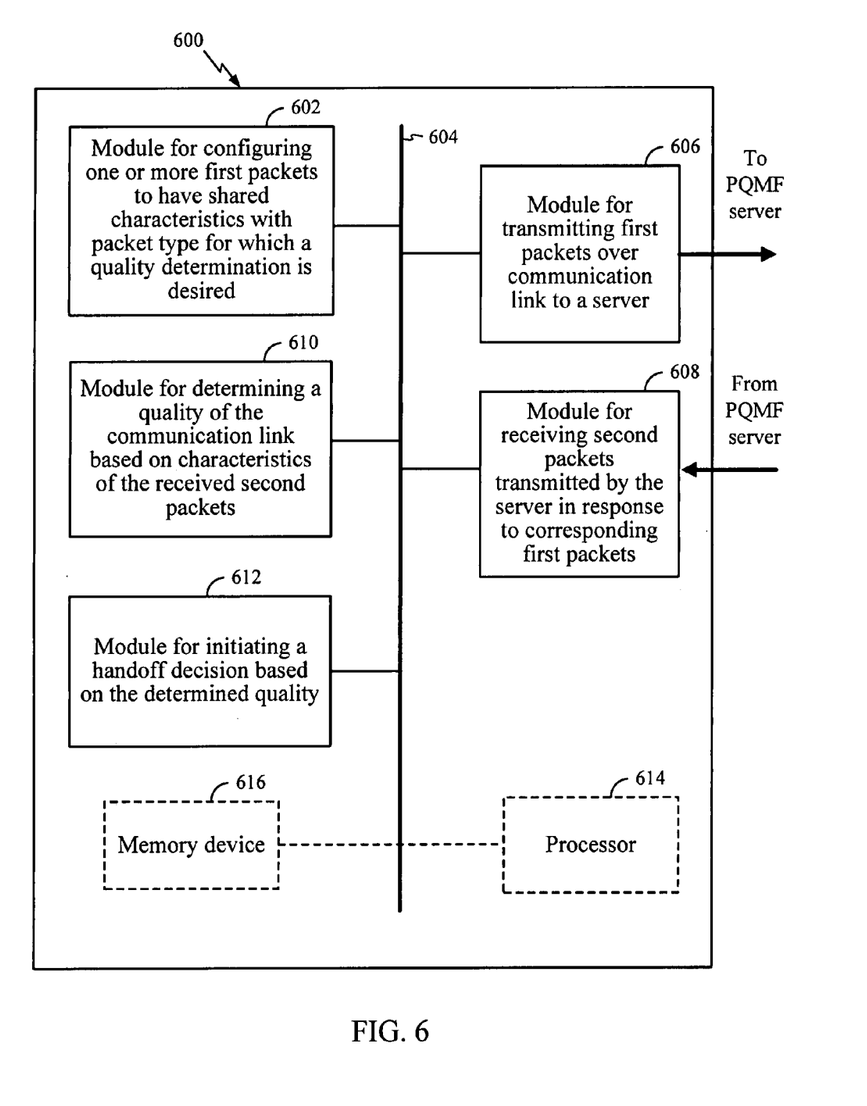
FIG. 6 illustrates an exemplary apparatus for determining the path quality of a communication link.

FIG. 6 illustrates an exemplary apparatus for determining the path quality of a communication link. It is noted that apparatus 600 may be configured as either a communication terminal or device, or as a processor or similar device for use within a communication terminal, device, or an AP. As illustrated, the apparatus includes a module 602 for configuring at least one or more first packets to have shared characteristics with packet type for which a quality determination is desired.

The first packets are communicated via a bus 604, or similar communication coupling, to a module 606 for transmitting the one or more first packets over a communication link to a server; namely a PQMF server as indicated in FIG. 6. As was discussed previously, a PQMF server returns one or more second packets, which are received by a module 608. The characteristics of the received second packets are then evaluated by a module 610 for determining a quality of the communication link based on characteristics of the received second packets. Apparatus 600 may also include a module 612, which initiates or triggers handoff of the apparatus from a connection with a current network, such as a WLAN, to another network, such as a WAN. Furthermore, the apparatus 600 may optionally include a processor 614 in the case of apparatus 600 configured as a communication terminal, rather than as a processor. Processor 614, in such case, may effect initiation and scheduling of the processes performed by the modules. Also, the apparatus 600 may include an optional computer readable medium or memory device 616 configured to store computer readable instructions and data for effecting the processes and behavior of either the modules or processor (in the case of apparatus 600 configured as a terminal) or the methods disclosed herein.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (not shown) may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. It is noted that the word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

What is claim is:

1. A method for determining the quality of a communication link transmitting a specified packet type, the method comprising:
  configuring at least one first packet that shares at least one packet characteristic with the specified packet type such that the at least one first packet experiences similar communication link treatment as the specified packet type;
  transmitting the at least one first packet over the communication link to a quality monitoring server during a time period in which packets of the specified packet type are being transmitted, wherein a periodicity of the transmission of a plurality of first packets is dependent on a roaming location;
  receiving at least one second packet different from the at least one first packet, wherein the at least one second packet is transmitted by the server in response to the at least one first packet, and wherein the at least one first packet and the at least one second packet are of the same packet type; and
  determining a quality of the communication link based on: a packet loss rate of the plurality of packets of the specified packet type or, if the packet loss rate inaccurately indicates the quality of the communication link due to at least a drop in a transmission rate of the plurality of packets of the specified packet type below a threshold, transmission characteristics of the received at least one second packet, wherein receiving the at least one second packet comprises receiving a plurality of second packets transmitted by the server in response to each first packet.

2. The method as defined in claim 1, wherein the communication link includes at least one of a wireless network and a wired network.

3. The method as defined in claim 1, wherein the at least one second packet is further configured to carry statistics computed at the server.

4. The method as defined in claim 1, wherein the size of the first and second packets matches at least one of a plurality of potential sizes of the specified packet type.

5. The method as defined in claim 1, wherein the first and second packets are configured as a standardized or proprietary packet type.

6. The method as defined in claim 1, wherein the transmission characteristics include at least one of:
 a time from transmission of the first packet to receipt of the second packet;
 a link loss rate computed over a set of past first and second packets; and
 packet jitter computed over a set of past first and second packets.

7. The method as defined in claim 1, further comprising: initiating one of:
 a handoff of a communication terminal to another communication link based on the quality determination;
 a change in at least one of a data rate and a coding rate of the communication terminal based on the quality determination; and
 call termination.

8. The method as defined in claim 7, wherein handoff to another communication link comprises at least one of a handoff to another network, a handoff to another serving cell of the same network, and a handoff to another frequency of the same network.

9. The method as defined in claim 1, wherein the at least one first packet is transmitted from one of a communication terminal and an access terminal to the server.

10. The method as defined in claim 1, wherein the at least one first packet is transmitted in response to receiving a report from a peer communication terminal indicating poor link quality.

11. The method as defined in claim 10, further comprising:
 sending a message to the peer communication terminal indicating that communication link quality is good when the determined quality of the communication link indicates such.

12. The method as defined in claim 1, wherein the specified packet type is one of a real time protocol packet or a non-real time packet.

13. The method as defined in claim 1, wherein the specified packet type comprises voice data and the transmission rate is decreased during a period of silence.

14. The method as defined in claim 1, wherein a transmission frequency of a plurality of first packets is adjusted in response to the determined quality of the communication link.

15. An apparatus for determining the quality of a communication link, the apparatus comprising:
 means for configuring at least one first packet that shares at least one packet characteristic with a specified packet type such that the at least one first packet experiences similar communication link treatment as the specified packet type;
 means for transmitting the at least one first packet over the communication link to a quality monitoring server during a time period in which packets of the specified packet type are being transmitted, wherein a periodicity of the transmission of a plurality of first packets is dependent on a roaming location;
 means for receiving at least one second packet different from the at least one first packet, wherein the at least one second packet is transmitted by the server in response to the at least one first packet, and wherein the at least one first packet and the at least one second packet are of the same packet type; and
 means for determining a quality of the communication link based on: a packet loss rate of the plurality of packets of the specified packet type or, if the packet loss rate inaccurately indicates the quality of the communication link due to at least a drop in a transmission rate of the plurality of packets of the specified packet type below a threshold, transmission characteristics of the received at least one second packet,
 wherein means for receiving the at least one second packet comprises means for receiving a plurality of second packets transmitted by the server in response to each first packet.

16. The apparatus as defined in claim 15, wherein the communication link includes at least one of a wireless network and a wired network.

17. The apparatus as defined in claim 15, wherein the at least one second packet is further configured to carry statistics computed at the server.

18. The apparatus as defined in claim 15, wherein the size of the first and second packets matches at least one of a plurality of potential sizes of the specified packet type.

19. The apparatus as defined in claim 15, wherein the first and second packets are configured as a standardized or proprietary packet type.

20. The apparatus as defined in claim 15, wherein the transmission characteristics include at least one of:
 a time from transmission of the first packet to receipt of the at least one second packet;
 a link loss rate computed over a set of past first and second packets; and
 packet jitter computed over a set of past first and second packets.

21. The apparatus as defined in claim 15, further comprising means for initiating one of:
 a handoff of a communication terminal to another communication link based on the quality determination;
 a change in at least one of a data rate and a coding rate of the communication terminal based on the quality determination; and
 call termination.

22. The apparatus as defined in claim 21, wherein handoff to another communication link comprises at least one of a handoff to another network, a handoff to another serving cell of the same network, and a handoff to another frequency of the same network.

23. The apparatus as defined in claim 15, wherein the at least one first packet is transmitted from one of a communication terminal or an access terminal to the server.

24. The apparatus as defined in claim 15, further comprising:
means for transmitting the at least one first packet in response to receiving a report from a peer communication terminal indicating poor link quality.

25. The apparatus as defined in claim 24, wherein the processor is further configured to send a message to the peer communication terminal indicating that communication link quality is good when the determined quality of the communication link indicates such.

26. The apparatus as defined in claim 15, wherein the specified packet type is one of a real time protocol packet or a non-real time packet.

27. The apparatus as defined in claim 15, wherein the specified packet type comprises voice data and the transmission rate is decreased during a period of silence.

28. The apparatus as defined in claim 15, wherein a transmission frequency of a plurality of first packets is adjusted in response to the determined quality of the communication link.

29. A communication device operable in a communication system, the communication device comprising:
a processor configured to:
configure at least one first packet that share at least one packet characteristic with a specified packet type such that the at least one first packet experiences similar communication link treatment as the specified packet type;
transmit the at least one first packet over the communication link to a quality monitoring server during a time period in which packets of the specified packet type are being transmitted, wherein a periodicity of the transmission of a plurality of first packets is dependent on a roaming location;
receive at least one second packet different from the at least one first packet, wherein the at least one second packet is transmitted by the server in response to the at least one first packet, and wherein the at least one first packet and the at least one second packet are of the same packet type; and
determine a quality of the communication link based on:
a packet loss rate of the plurality of packets of the specified packet type or, if the packet loss rate inaccurately indicates the quality of the communication link due to at least a drop in a transmission rate of the plurality of packets of the specified packet type below a threshold, transmission characteristics of the received at least one second packet,
wherein receiving the at least one second packet comprises receiving a plurality of second packets transmitted by the server in response to each first packet.

30. The communication device as defined in claim 29, wherein the communication link includes at least one of a wireless network and a wired network.

31. The communication device as defined in claim 29, wherein the at least one second packet is further configured to carry statistics computed at the server.

32. The communication device as defined in claim 29, wherein the size of the first and second packets matches at least one of a plurality of potential sizes of the specified packet type.

33. The communication device as defined in claim 29, wherein the first and second packets are configured as a standardized or proprietary packet type.

34. The communication device as defined in claim 29, wherein the transmission characteristics include at least one of:
a time from transmission of the first packet to receipt of the at least one second packet;
a link loss rate computed over a set of past first and second packets; and
packet jitter computed over a set of past first and second packets.

35. The communication device as defined in claim 29, wherein the processor is further configured to initiate one of:
a handoff of a communication terminal to another communication link based on the quality determination;
a change in at least one of a data rate and a coding rate of the communication terminal based on the quality determination; and
call termination.

36. The communication device as defined in claim 35, wherein handoff to another communication link comprises at least one of a handoff to another network; a handoff to another serving cell of the same network, and a handoff to another frequency of the same network.

37. The communication device as defined in claim 29, wherein the processor is further configured to transmit a plurality of first packets in response to receiving a report from a peer communication terminal indicating poor link quality.

38. The communication device as defined in claim 37, wherein the processor is further configured to send a message to the peer communication terminal indicating that communication link quality is good when the determined quality of the communication link indicates such.

39. The communication device as defined in claim 29, wherein the specified packet type is one of a real time protocol packet or a non-real time packet.

40. The communication device as defined in claim 29, wherein the specified packet type comprises voice data and the transmission rate is decreased during a period of silence.

41. The communication device as defined in claim 29, wherein a transmission frequency of a plurality of first packets is adjusted in response to the determined quality of the communication link.

42. A computer program product, comprising:
a non-transitory computer-readable medium comprising:
code for causing a computer to configure at least one first packet that shares at least one packet characteristic with a specified packet type such that the at least one first packet experiences similar communication link treatment as the specified packet type;
code for causing the computer to transmit the at least one first packet over the communication link to a quality monitoring server during a time period in which packets of the specified packet type are being transmitted, wherein a periodicity of the transmission of a plurality of first packets is dependent a roaming location;
code for causing the computer to receive at least one second packet different from the at least one first packet, wherein the at least one second packet is transmitted by the server in response to the at least one first packet, and wherein the at least one first packet and the at least one second packet are of the same packet type; and
code for causing the computer to determine a quality of the communication link based on: a packet loss rate of the plurality of packets of the specified packet type or, if the packet loss rate inaccurately indicates the quality of the communication link due to at least a drop in a transmission rate of the plurality of packets of the specified packet type below a transmission threshold, transmission characteristics of the received at least one second packet, wherein receiving the at least one second packet comprises receiving a plurality of second packets transmitted by the server in response to each first packet.

43. The computer program product as defined in claim 42, wherein the communication link includes at least one of a wireless network and a wired network.

44. The computer program product as defined in claim 43, wherein the at least one first packet is transmitted from one of a communication terminal or an access terminal to the server.

45. The computer program product as defined in claim 43, wherein the computer-readable medium further comprises:
   code for causing the computer to transmit the at least one first packet in response to receiving a report from a peer communication terminal indicating poor link quality.

46. The computer program product as defined in claim 45, wherein the computer-readable medium further comprises:
   code for causing the computer to send a message to the peer communication terminal indicating that communication link quality is good when the determined quality of the communication link indicates such.

47. The computer program product as defined in claim 43, wherein the specified packet type is one of a real time protocol packet or a non-real time packet.

48. The computer program product as defined in claim 42, wherein the at least one second packet is further configured to carry statistics computed at the server.

49. The computer program product as defined in claim 42, wherein the size of the first and second packets matches at least one of a plurality of potential sizes of the specified packet type.

50. The computer program product as defined in claim 42, wherein the first and second packets are configured as a standardized or proprietary packet type.

51. The computer program product as defined in claim 42, wherein the transmission characteristics include at least one of:
   a time from transmission of the first packet to receipt of the second packet;
   a link loss rate computed over a set of past first and second packets; and
   packet jitter computed over a set of past first and second packets.

52. The computer program product as defined in claim 42, wherein the computer-readable medium further comprises:
   code for causing the computer to initiate one of:
   a handoff of a communication terminal to another communication link based on the quality determination;
   a change in at least one of a data rate and a coding rate of the communication terminal based on the quality determination; and
   call termination.

53. The computer program product as defined in claim 52, wherein handoff to another communication link comprises at least one of a handoff to another network, a handoff to another serving cell of the same network, and a handoff to another frequency of the same network.

54. The computer program product as defined in claim 42, wherein the specified packet type comprises voice data and the transmission rate is decreased during a period of silence.

55. The computer program product as defined in claim 42, wherein a transmission frequency of a plurality of first packets is adjusted in response to the determined quality of the communication link.

* * * * *